United States Patent
Fujibayashi et al.

(10) Patent No.: US 7,405,257 B2
(45) Date of Patent: Jul. 29, 2008

(54) POLYURETHANE RESIN-BASED MATERIAL FOR SLUSH MOLDING

(75) Inventors: Shinya Fujibayashi, Otu (JP); Hideki Omori, Otu (JP); Shogo Nishioka, Matsudo (JP); Shigeto Takeuchi, Toyota (JP); Mahito Nomura, Toyota (JP)

(73) Assignees: Sanyo Chemical Industries, Ltd., Kyoto (JP); Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 10/510,905

(22) PCT Filed: Apr. 8, 2003

(86) PCT No.: PCT/JP03/04469

§ 371 (c)(1),
(2), (4) Date: May 5, 2005

(87) PCT Pub. No.: WO03/085023

PCT Pub. Date: Oct. 16, 2003

(65) Prior Publication Data

US 2006/0045996 A1    Mar. 2, 2006

(30) Foreign Application Priority Data

Apr. 10, 2002 (JP) .............................. 2002-108466
Apr. 10, 2002 (JP) .............................. 2002-108467
Aug. 2, 2002 (JP) .............................. 2002-226743
Apr. 2, 2003 (JP) .............................. 2003-099710

(51) Int. Cl.
*C08L 75/08* (2006.01)

(52) U.S. Cl. .................. 524/589; 524/121; 524/136; 524/140; 524/145; 524/268; 524/287; 524/290; 524/292; 524/306; 524/308; 528/44; 528/76; 528/85

(58) Field of Classification Search .................. None
See application file for complete search history.

(56) References Cited

U.S. PATENT DOCUMENTS 6,177,508 B1 *    1/2001    Ohmori et al. .............. 524/590

FOREIGN PATENT DOCUMENTS

| JP | 52-36588 | 9/1975 |
|----|----------|--------|
| JP | 52-39587 | 9/1975 |
| JP | 52-42550 | 9/1975 |
| JP | 52-036588 | 3/1977 |
| JP | 52-039587 | 3/1977 |
| JP | 53-40052 | 4/1978 |
| JP | 63-075038 | 4/1988 |
| JP | 1-126389 | 5/1989 |
| JP | 01-126389 | 5/1989 |
| JP | 02-004860 | 1/1990 |
| JP | 03-031359 | 2/1991 |
| JP | 05-043826 | 2/1993 |
| JP | 05-301228 | 11/1993 |
| JP | 5-301228 | 11/1993 |
| JP | 07-133423 | 5/1995 |
| JP | 07-278162 | 10/1995 |
| JP | 7-278162 | 10/1995 |
| JP | 08-120041 | 5/1996 |
| JP | 08-325348 | 12/1996 |
| JP | 9-59385 | 3/1997 |
| JP | 09-0593385 | 3/1997 |
| JP | 10-259369 | 9/1998 |
| JP | 10-338733 | 12/1998 |
| JP | 11-012343 | 1/1999 |
| JP | 11-049948 | 2/1999 |
| JP | 11-49948 | 2/1999 |
| JP | 11-116796 | 4/1999 |
| JP | 11-192678 | 7/1999 |
| JP | 11-228833 | 8/1999 |
| JP | 2000-017032 | 1/2000 |
| JP | 2000-17032 | 1/2000 |
| JP | 2000-17033 | 1/2000 |
| JP | 2000-017033 | 1/2000 |
| JP | 2000-103956 | 4/2000 |
| JP | 2000-103957 | 4/2000 |
| JP | 2000-119393 | 4/2000 |
| JP | 2000-128956 | 5/2000 |
| JP | 2000-265054 | 9/2000 |

(Continued)

OTHER PUBLICATIONS

Shigeto Takeuchi, et al.; *Development of Thermoplastic Polyurethane (TPU) Powder Slush Material for Interior Parts*; Toyota Technical Review; vol. 51.; No. 2; Dec. 2001.

Shigeto Takeuchi, et al.; *Development of Thermoplastic Polyurethane (TPU) Powder Slush Material for Interior Parts*; SAE Technical Paper Series; 2002-01-0312.

*Primary Examiner*—Marc S Zimmer
(74) *Attorney, Agent, or Firm*—Edwards Angell Palmer & Dodge LLP

(57) ABSTRACT

The present invention provides a material for slush molding which is improved in melt properties during slush molding and is excellent in heat resistance, the material being made up of a thermoplastic polyurethane resin (A) the difference between the softening starting temperature (STi) and the softening ending temperature by TMA being from 0 to 30° C., and STi being 135 to 200° C. The resin (A) has a hard segment with an Mn of 200 to 2000 comprising a diisocyanate having a symmetrical structure, a low molecular-weight diamine having a symmetrical structure, and/or a low molecular-weight diol, the content of which being from 5 to 50 wt %, and a soft segment making up of a high molecular-weight diol with an Mn of 500 to 5000, with the aromatic content being 35 wt % or less and the aromatic ring content x and the urea group content y satisfying $$-0.1x+2.5 \leq y \leq -0.1x+6.$$

20 Claims, 1 Drawing Sheet

FOREIGN PATENT DOCUMENTS

| | | |
|---|---|---|
| JP | 2000-290494 | 10/2000 |
| JP | 2000-297156 | 10/2000 |
| JP | 2000-313733 | 11/2000 |
| JP | 2000-321895 | 11/2000 |
| JP | 2001-040056 | 2/2001 |
| JP | 2001-055457-N | 2/2001 |
| JP | 2001-106787 | 4/2001 |
| JP | 2001-115010 | 4/2001 |
| JP | 2001-191337 | 7/2001 |
| JP | 2001-192549 | 7/2001 |
| JP | 2001-200155 | 7/2001 |
| JP | 2002-348462 | 12/2002 |
| JP | 2003-119280 | 4/2003 |
| JP | 2003-300428 | 10/2003 |
| JP | 2004-002786 | 1/2004 |
| JP | 2004-067776 | 3/2004 |
| WO | WO 95/00307 | 1/1995 |
| WO | WO-95/00307 | 1/1995 |

* cited by examiner

POLYURETHANE RESIN-BASED MATERIAL FOR SLUSH MOLDING

CROSS-REFERENCE TO RELATED APPLICATION(S)

This application is a §371 application of copending international patent application PCT/JP03/04469, filed on Apr. 8, 2003, which application designates the U.S.

1. Technical Field

The present invention relates to a material for slush molding, particularly a material for slush molding useful for automobile interiors.

2. Background Art

Conventionally, to improve adhesion properties to padding cloth, water washing resistance and dry cleaning resistance, a hot melt adhesive is proposed that comprises a thermoplastic polyurethane resin that causes both the difference between the softening starting temperature and the softening, ending temperature by the thermomechanical analysis penetration mode and the softening starting temperature to be in a specific range, and it is described that the hot melt adhesive is also used for material for slush molding. (For example, see Japanese Patent No. 2984921.)

However, it is desired that a material for slush molding, particularly a material suitably applied to automobile interiors, satisfy conditions such as obtaining a molded material excellent in heat resistance and appearance and a material excellent in wear resistance, and the like. When attention is given to a polyurethane based material, a material for slush molding that meets these characteristics has never been known yet.

On the other hand, an instrument panel in which an air bag is mounted therein is placed at the air bag door section a tear line for expanding the air bag at required time. Although this tear line is put in both the front and the back surfaces of the panel skin to readily tear open the door portion in the conventional panel, when appeared on the exterior design face, aesthetic sense is lost, and thus an instrument panel is proposed that integratedly has an air bag door sections which are made devised such as forming the tear line only in the back of the surface so that the tear line does not appear on the design face.

However, if a soft polyvinyl chloride-based powder material used in a conventional panel is used for the instrument panel, even in portions other than of the tear line as well tear opening takes place upon air bag expansion because the embrittlement and shrinkage of the resin occur due to time-elapsing escape of the plasticizer. To cope with such problem, an appropriately cross-linked thermoplastic polyurethane resin material is proposed (e.g., Japanese Unexamined Patent Application Publication No. 2001-40056). However, the above-described proposals hardly seem to sufficiently solve the problem.

Hence, the present invention is directed to the provision of a material for slush molding with the improvement of melt properties during slush molding, and excellent in heat resistance.

Also, the present invention is directed to the provision of a material for slush molding which causes tear opening along the tear line upon air bag expansion under wide use conditions, which is suited to surface molding, and which hardly takes place tear opening in the other portions, in an instrument panel integratedly having air bag door sections molded such that the tear line does not appear on the design face.

DISCLOSURE OF THE INVENTION

In other words, the present invention provides a material for slush molding comprising a thermoplastic polyurethane resin (A) (hereinafter, may also be called a resin (A)) in which the difference (hereinafter, abbreviated as DST) between the softening starting temperature and the softening ending temperature (hereinafter, abbreviated as STi and STe, respectively) by the thermomechanical analysis penetration mode of the resin (A) is from 0 to 30° C. and in which STi is 135 to 200° C. The resin (A) preferably comprises a polyurethane resin having a hard segment (A1) with a number average molecular weight of 200 to 2000 comprising a diisocyanate (a1) having a symmetrical structure, and at least one species selected from the group consisting of a low molecular-weight diamine (a2) having a symmetrical structure and a low molecular-weight diol (a3), and a soft segment (A2) comprising a high molecular-weight diol (a4) with a number average molecular weight of 500 to 5000, with the content of hard segment in the resin being from 5 to 50% by weight, the content of aromatic rings in the resin being 35% by weight or less, and the content of aromatic rings and the content of urea groups satisfying the following equation (i):

$$-0.1x+2.5 \leq y \leq -0.1x6 \qquad (i)$$

wherein x represents the content (% by weight) of aromatic rings in the resin (A), and y the content (% by weight) of urea groups in the resin (A).

The materials for molding of the present invention can further include a plasticizer (B), an internal release agent (C), and an additive (D).

In addition, the present invention also includes a molded article produced by heat molding the material for molding; a slush molding skin for automobile interior made by heat molding the material for molding; and an automobile interior material comprising the molding skin.

Furthermore, the present invention also includes a method for producing an automobile interior instrument panel skin integratedly having an air bag door sections formed so that the tear line for tear opening does not appear on the design face, the method comprising a step of heat molding the material for molding, and a step of forming the tear line for tear opening the air bag door sections in the molded material obtained by the above-described step in such a way that the tear line for tear opening the air bag door sections does not appear on the design face.

BEST MODE FOR CARRYING OUT THE INVENTION

Figure 1:
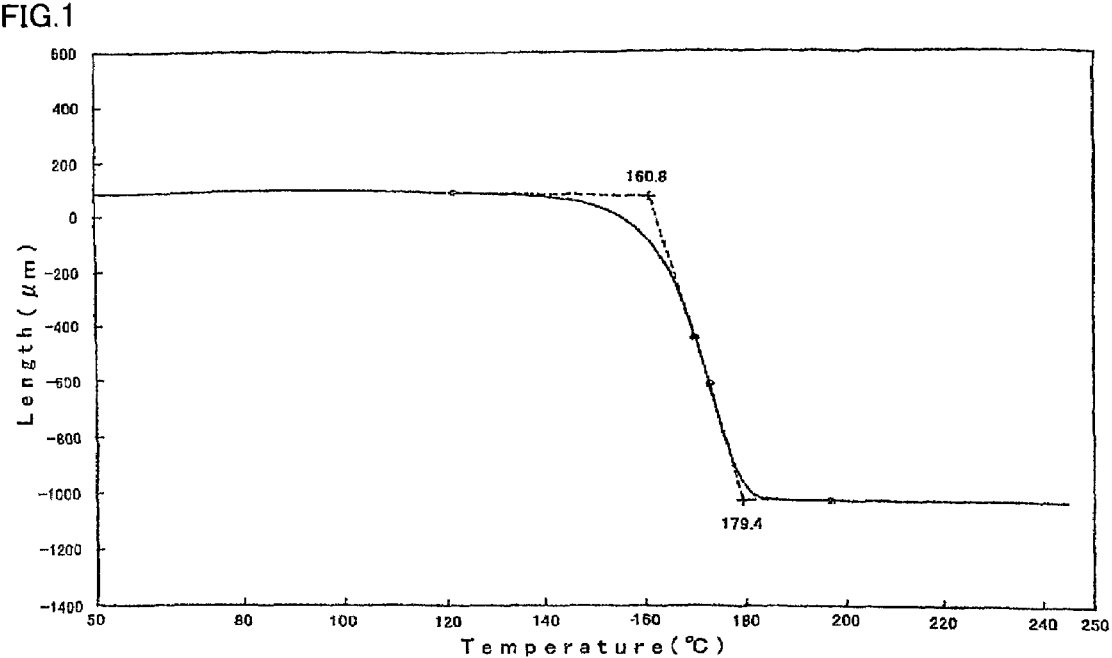
FIG. 1 is a TMA chart of an urethane resin powder (F1) used in Example 1.

For a thermoplastic polyurethane resin (A) in the present invention, the STi (measurement conditions: rate of temperature rise 5° C./min, load 5 g, and needle diameter 0.5 mm) is from 135 to 200° C., preferably from 145 to 180° C., more preferably from 150 to 170° C. When the STi is less than 135° C., the heat resistance of the skin is worsened; if the STi exceeds 200° C., the heat melt properties at a molding temperature are deteriorated.

Also, ΔST by means of the thermomechanical analysis penetration mode is from 0 to 30° C., preferably from 2 to 27°

C., more preferably from 3 to 25° C. When ΔST exceeds 30° C., the melt properties and the heat resistance can be incompatible with each other. A resin of such small ΔST has a sharp melt properties.

The aforementioned thermomechanical analysis penetration mode is a method described, for example, in "Introduction to Thermal Analysis for Material Science" written by Yasutoshi Saitoh [published by Kyoritsu Shuppan Co., Ltd., 1990], p 350, or "Fundamentals and Applications of New Thermal Analyses" edited by Japan Society of Calorimetry and Thermal Analysis [published by Realize Corp.], p 68, or in Japanese Unexamined Patent Application Publication No. 10-259369.

A thermoplastic polyurethane resin (A) in the present invention preferably comprises, for example, a polyurethane resin having a hard segment (A1) with a number average molecular weight (hereinafter, Mn) of 200 to 2000 comprising a diisocyanate (a1) having a symmetrical structure, and at least one species selected from the group consisting of a low molecular-weight diamine (a2) having a symmetrical structure and a low molecular-weight diol (a3), and a soft segment (A2) comprising a high molecular-weight diol (a4) with an Mn of 500 to 5000, with the content of hard segment in the polyurethane resin being from 5 to 50% by weight, the content of aromatic rings in the polyurethane resin being 35% by weight or less, and the content of aromatic rings and the content of urea groups satisfying the following relation (i):

$$-0.1x+2.5 \leq y \leq -0.1x6 \qquad (i)$$

wherein x represents the content (% by weight) of aromatic rings in the polyurethane resin, and y the content (% by weight) of urea groups in the polyurethane resin.

In the present description, the term "having a symmetrical structure" means that a planar chemical structural formula of a compound has a linear symmetrical structure.

1. Diisocyanates (a1) Having a Symmetrical Structure

Examples of the diisocyanate (a1) can include aliphatic diisocyanates having a carbon number (exclusive of the carbon of the NCO group. Hereinafter, the same) of 2 to 18 such as 1,2-ethylenediisocyanate, 1,4-tetramethylenediisocyanate, 1,6-hexamethylenediisocyanate (hereinafter abbreviated as HDI), 1,8-octamethylenediisocyanate, 1,12-dodecamethylenediisocyanate, and the like; alicyclic diisocyanates having a carbon number of 4 to 15 such as 4,4'-dicyclohexylmethanediisocyanate (hereinafter abbreviated as hydrogenated MDI), cyclohexane-1,4-diisocyanate, and the like; aromatic aliphatic diisocyanates having a carbon number of 8 to 15 such as p-xylenediisocyanate, α,α,α',α'-tetramethylxylylenediisocyanate, and the like; aromatic diisocyanates having a carbon number of 6 to 18 such as 4,4'-diphenylmethanediisocyanate, and the like; carbonate-based diisocyanates having a carbon number of 3 to 17 such as bis(2-isocyanatoethyl) carbonate, and the like; and modified compounds having a symmetrical structure of diisocyantes thereof (modified compounds having a symmetrical structure, containing an urethane group, a carbodiimide group, an urea group, an urethodione group and an oxazolidone group; and the like); and mixtures containing two species thereof or more.

The preferred of these include 1,2-ethylenediisocyanate, 1,4-tetramethylenediisocyanate, 1,6-hexamethylenediisocyanate, 1,12-dodecamethylenediisocyanate, bis(2-isocyanate ethyl) carbonate, 4,4'-dicyclohexylmethanediisocyanate, cyclohexane-1,4-diisocyanate, p-xylenediisocyanate, α,α,α',α'-tetramethylxylylenediisocyanate, and 4,4'-diphenylmethanediisocyanate. The particularly preferred include hydrogenated MDI and HDI, more preferably HDI.

Diisocyanates (a1') having an asymmetrical structure (e.g., isophoronediisocyanate, trimethylhexamethylenediisocyanate and the like) can be used along with the above-described diisocyanates (a1) as well. For the amount of use of diisocyanates (a1') having an asymmetrical structure, from the viewpoint of melt properties, (a1')/(a1) is preferably 0.25 or less in the molar ratio.

2. Low Molecular-Weight Diamines (a2) Having a Symmetrical Structure (Hereinafter Referred to as Diamines (a2))

Examples of the diamines (a2) include straight chain alkylene diamines having a carbon number of 2 to 18 such as 1,2-ethylene diamine, 1,4-tetramethylenediamine, 1,6-hexamethylenediamine (hereinafter abbreviated as HDA), 1,8-octamethylenediamine, 1,12-dodecamethylenediamine and the like; alicyclic diamines having a carbon number of 4 to 15 such as 4,4'-dicyclohexylmethanediamine (hereinafter abbreviated as hydrogenated MDA), cyclohexane-1,4-diamine and the like; aromatic aliphatic diamines having a carbon number of 8 to 15 such as p-xylylenediamine, α,α,α',α'-tetramethylxylylenediamine and the like; aromatic diamines having a carbon number of 6 to 18 such as 4,4'-diamino-diphenylmethane and the like; carbonate-based diamines having a carbon number of 3 to 17 such as bis(2-aminoethyl) carbonate and the like; polyoxyethylenediamine (molecular weight 500 or less) and the like; polyoxytetramethylenediamine (molecular weight 500 or less); and mixtures of two species thereof or more, and the like.

The preferred of these include straight chain alkylenediamines having a carbon number of 2 to 18, bis(2-aminoethyl) carbonate, 4,4'-dicyclohexylmethanediamine, cyclohexane-1,4-diamine, p-xylylenediamine, α,α,α',α'-tetramethylxylylenediamine, and 4,4'-diamino-diphenylmethane. The more preferred include ethylenediamine, and hydrogenated MDA and HDA, particularly preferably HDA.

As a combination of the above-mentioned diisocyanate (a1) and the above-mentioned diamine (a2), a species that a residue (excluding an amino group) of a diamine (a2) has the same structure as a residue (excluding an isocyante group) of a diisocyanate (a1) is preferable. Examples of the combination include HDI and HDA; bis(2-isocyanate ethyl) carbonate and bis(2-aminoethyl) carbonate; hydrogenated MDI and hydrogenated MDA; cyclohexane-1,4-diisocyanate and cyclohexane-1,4-diamine; p-xylylenediisocyanate and p-xylylenediamine; α,α,α',α'-tetramethylxylylenediisocyanate and α,α,α',α'-tetramethylxylylenediamine; 4,4'-diphenylmethanediisocyanate and 4,4'-diamino-diphenylmethane; and the like.

A diamine (a2') having an asymmetrical structure (e.g., isophoronediamine, trimethylhexamethylenediamine and the like) can also be used together with the above-mentioned diamine (a2). The amount of use of a diamine (a2'), in terms of melt properties, (a2')/(a2) is preferably 0.25 or less in the molar ratio.

The above-mentioned diamine (a2) may be used in the form of a ketimine. The ketimines include ketimines produced, for example, by reacting diamines with ketones having a carbon number of 3 to 6 (acetone, methylethylketone (hereinafter abbreviated as MEK), methylisobutyl ketone and the like).

3. Low Molecular-Weight Diols (a3)

The low molecular-weight diols (a3) include, for example, diols having an Mn of less than 500.

Illustrative examples of the aforementioned low molecular-weight diol (a3) include aliphatic diols having a carbon number of 2 to 18 [straight chain diols (ethylene glycol, diethylene glycol, 1,3-propanediol, 1,4-butanediol (hereinafter abbreviated as BG), 1,5-pentanediol, 1,6-hexanediol and the like), diols having a branched chain (propylene glycol, neopentyl glycol, 3-methyl-1,5-pentanediol (hereinafter abbreviated as MPD), 2,2-diethyl-1,3-propanediol, 1,2-, 1,3- or 2,3-butanediol and the like), and the like]; diols having cyclic groups having a carbon number of 3 to 18[e.g., species described in Japanese Examined Patent Application Publication No. 45-1474; diols containing aliphatic cyclic groups having a carbon number of 3 to 30 (1,4-bis (hydroxymethyl) cyclohexane, hydrogenated bisphenol A and the like); diols containing aromatic cyclic groups having a carbon number of 6 to 15 ((m-, and p-)xylyleneglycol); alkylene oxide (AO) adducts (addition mole number 2 to 6) of at least one species selected from the group consisting of pyrocatechol, resorcinol, hydroquinone, bisphenol A, bisphenol S, bisphenol F and dihydroxynaphthalene; AO adducts of the aforementioned diols (addition mole number 1 to 6)] and mixtures of two species thereof or more.

Examples of the aforementioned AO include ethyleneoxide (EO), propylene oxide (PO), 1,2-, 1,3-, 1,4- and 2,3-butyleneoxides, styreneoxide, α-olefinoxides having a carbon number of 5 to 10 or more, epichlorohydrin, and mixtures of two species thereof or more (block or random addition).

Of the above-mentioned low molecular-weight diols (a3), for example, diols (a3') of a symmetrical structure having an Mn of less than 500 such as species indicated by the general formulas (1), (2) and (3) below [hereinafter, set to be each diol (a3' 1), diol (a3' 2), and diol (a3' 3)], EO adduct of the aforementioned diols (a3' 1) or tetrahydrofuran (hereinafter abbreviated as THF) adducts (a3' 4), glycols (a3' 5) having a side chain, and the like; and mixtures of two species thereof and more are preferable. Of these, diols (a3' 1), diols (a3' 2), and diols (a3' 3) are more preferable.

$$HO(CH_2)_m\text{-}(Q^1)p\text{-}(CH_2)_mOH \quad (1)$$

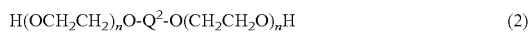
$$H(OCH_2CH_2)_nO\text{-}Q^2\text{-}O(CH_2CH_2O)_nH \quad (2)$$

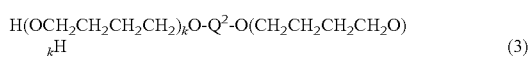
$$H(OCH_2CH_2CH_2CH_2)_kO\text{-}Q^2\text{-}O(CH_2CH_2CH_2CH_2O)_kH \quad (3)$$

wherein in the formula (1), $Q^1$ is a metylene group, 1,4-cyclohexylene group or 1,4-phenylene group, p is 0 or 1, and m is 0 or an integer of 1 to 6 (provided that if p is 0 or $Q^1$ is a 1,4-phenylene group, then m is from 1 to 6), wherein in the formulas (2) and (3), $Q^2$ is a residue of bisphenols or 1,4-phenylene group, n is an integer of 1 to 3, in formula (3), k is 1 or 2, and when $Q^2$ is a residue of bisphenols, k is 1.

The bisphenols include the groups indicated by the general formula (4) below.

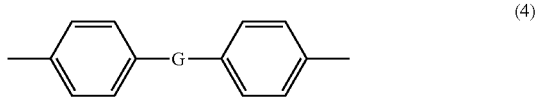

(4)

wherein in the formula (4), G represents a direct bonding, an alkylene group of a carbon number of 1 to 6, an alkylidene group having a carbon number of 2 to 6, a cycloalkylidene, an arylalkylidene group, O, SO, $SO_2$, CO, S, $CF_2$, $C(CF_3)_2$ or NH.

The aforementioned diols (a3' 1) include, for example, straight chain alkylenediols having a carbon number of 2 to 18 such as ethylene glycol, 1,4-butanediol (hereinafter abbreviated as BG), 1,6-hexanediol (hereinafter abbreviated as HG), 1,8-octanediol, and 1,12-dodecanediol; alicyclic diols having a carbon number of 4 to 15 such as 1,4-bis(hydroxymethyl)cyclohexane, and 1,4-cyclohexanediol; aromatic aliphatic diols having a carbon number of 8 to 15 such as p-xylylene glycol and the like.

The aforementioned diols (a3' 2) include, for example, EO (2 to 6 mol) adducts of hydroquinone, EO (2 to 6 mol) adducts of bisphenol A, EO (2 to 6 mol) adducts of bisphenol F, EO (2 to 6 mol) adducts of bisphenol S, and the like.

The aforementioned diols (a3' 3) include, for example, THF (2 to 4 mol) adducts of hydroquinone, THF (2 to 4 mol) adducts of bisphenol A, THF (2 to 4 mol) adducts of bisphenol F, THF (2 to 4 mol) adducts of bisphenol S, and the like.

The aforementioned adducts (a3' 4) include, for example, diethylene glycol, triethylene glycol, and the like.

The aforementioned glycols (a3' 5) include, for example, neopentyl glycol and the like.

The preferred examples as the aforementioned diols (a3') of a symmetrical structure include ethylene glycol, 1,4-butanediol, 1,6-hexanediol, 1,4-bis(hydroxymethyl)cyclohexane and 1,4-cyclohexanediol, and the particularly preferred include 1,4-butanediol, 1,6-hexanediol, and 1,4-bis(hydroxymethyl)cyclohexane.

The above-described diamine (a2) and the above-described low molecular-weight diol (a3) can also be used singly, but are preferably used along with a diamine (a2) and a diol (a3). The molar ratio thereof (a2)/(a3)=0.5 to 10, particularly preferably 1 to 5.

In the present invention, the Mn of a hard segment (A1) made up of the above-described diisocyanates (a1), and at least one species selected from the group consisting of the above-described diamines (a2) and the above-described low molecular-weight diols (a3) is preferably from 200 to 2000, more preferably from 300 to 1000. From the viewpoint of a sharp melt properties, the Mn is preferably 200 or more, and from the standpoint of STi, the Mn is preferably 2000 or less. The Mn of the hard segment (A1) can be calculated from the following equation (ii).

[weight of diisocyanate (a1)+weight of diamine (a2)+ weight of diol (a3)]/

[mole number of diisocyanate (a1)–mole number of diamine (a2)–mole number of diol (a3)]  (ii)

In addition, the content of hard segment (A1) [total of the diisocyanate (a1)+the diamine (a2)+the diol (a3)] in the above-described resin (A) is, from the viewpoint of heat resistance of the skin, preferably 5% by weight or more, and from the viewpoint of the STi, is preferably 50% by weight or less, more preferably from 8 to 40% by weight, particularly preferably from 10 to 30% by weight.

4. High Molecular-Weight Diols (a4)

A high molecular-weight diol (a4) preferably has an Mn of from 500 to 5,000, more preferably from 700 to 3000, and has the ratio of the weight average molecular weight (hereinafter abbreviated by Mw) to the Mn of preferably from 1.0 to 3.0, particularly preferably from 1.0 to 2.0. The Mn is, from the standpoint of the feeling and STi, preferably 500 or more, and is, from the standpoint of a sharp melt properties, preferably 5000 or less. The Mw and the Mn of a diol (a4) is determined by Gel Permeation Chromatography (hereinafter abbreviated as GPC) using THF as the solvent.

Examples of the above-mentioned diol (a4) include polyetherdiols, polyesterdiols, polysiloxane glycol, polybutadiene glycol, acryldiols, polymerdiols (diols produced by polymerizing vinyl monomers in a diol having a high molecular weight) and mixtures of two species thereof and more. The preferred of these include polyetherdiols and polyesterdiols.

The polyetherdiols include, for example, compounds made by adding AOs to compounds having two active hydrogen atoms (dihydric alcohols, dihydric phenols, primary monoamines and the like), mixtures thereof, and the like.

The aforementioned dihydric alcohols include, for example, alkylene glycols such as ethylene glycol, diethylene glycol, propylene glycol, 1,3- and 1,4-butanediol, 1,6-hexanediol, neopentyl glycol, diols having a cyclic group (for example, compounds described in Japanese Examined Patent Application Publication No. 45-1474), and the like. Also, the dihydric phenols include single-ring polyphenols such as pyrogallol, hydroquinone, and phloroglucine; bisphenols such as bisphenol A, bisphenol S, bisphenol F, and the like.

The compounds having two active hydrogen atoms preferably include dihydric alcohols, particularly 1,4-butanediol.

Examples of the AO include AOs having a carbon number of 2 to 8, substituted AOs such as EO, PO, 1,2-, 1,3-, and 2,3-butyleneoxides, THF, styrene oxide, combinations of two species thereof or more (block or random addition), and the like. The preferred of these include PO and a combination of EO and PO.

The polyesterdiols include, for example, ① condensed polyesterdiols, ② polylactonediols, ③ polycarbonatediols, and combinations of two species thereof or more.

The aforementioned condensed polyesterdiol ① can be produced, for example, by condensation polymerization of one species or more of diols (low molecular-weight diols and/or polyetherdiols and the like) and a dicarboxylic acid or a ester-forming derivative thereof [a lower alkyl (carbon number 1 to 4) ester, acid anhydride, a halide (a chloride or the like), or the like], or the reaction of a diol with a dicarboxylic anhydride and an AO.

The aforementioned polylactonediol ② can be obtained by ring-opening polymerization of a lactone using one species or more of the aforementioned diol as an initiator.

The aforementioned polycarbonatediol ③ can be produced by the reaction of the aforementioned diol with an alkylene carbonate (ethylene carbonate).

Of raw materials diols for the aforementioned polyesterdiols ①, ② and ③, low molecular-weight diols can include, for example, aliphatic low molecular-weight diols (ethylene glycol, diethylene glycol, propylene glycol, 1,4-butanediol, 1,6-hexanediol, and the like); low molecular-weight diols having a cyclic group [e.g., diols described in Japanese Examined Patent Application Publication No. 45-1474: 1,4-bis(hydroxymethyl)cyclohexane, m- or p-xylylene glycol, and the like]; alkylene oxide low molecular-weight adducts (molecular weight below 500) of bisphenols; combinations of two species thereof or more; and the like. The polyetherdiols can include, for example, one species or more of polyetherdiols and the like discussed previously, preferably 1,4-butanediol and 1,6-hexanediol.

The raw materials dicarboxylic acids for the above-mentioned condensed polyesterdiols ① include, for example, aliphatic dicarboxylic acids having a carbon number of 2 to 10 (succinic acid, adipic acid, sebacic acid, glutaric acid, azelaic acid, maleic acid, fumaric acid, and the like), aromatic dicarboxylic acids having a carbon number of 8 to 12 (terephthalic acid, isophthalic acid, and the like), combinations of two species thereof or more, and the like.

Preferred examples of the above-mentioned condensed polyesterdiols ① can include polybutyleneadipatediol (PBA) and polyhexamethyleneisophthalatediol (PHIP), a combination thereof, and the like.

The raw materials lactones for the aforementioned polylactonediols ② include, for example, γ-butyrolactone, γ-valerolactone, ε-caprolactone, combinations of two species thereof or more, and the like.

The aromatic ring content x in the above-described resin (A) is preferably 35% by weight or less, and the urea group content (% by weight) y preferably is in a range of satisfying the equation (i) below. In other words, from the viewpoint of melt properties, y does not preferably exceed $-0.1x+6$, from the viewpoint of heat resistance, y is at least equal to $-0.1x+2.5$, and from the viewpoint of low temperature properties, x is preferably 35% by weight or less.

$$-0.1x+2.5 \leq y \leq -0.1x+6 \quad \text{(i)}$$

Furthermore, it is preferred that the equation (i'') below is satisfied and x is from 1 to 30% by weight.

$$-0.1x+2.5 \leq y \leq -0.1x+5.5 \quad \text{(I'')}$$

In particular, it is preferred that the equation (i''') below is satisfied and x is from 2 to 30% by weight.

$$-0.1x+2.5 \leq y \leq -0.1x+5.5 \quad \text{(I''')}$$

From the standpoint of wear resistance, it is most preferred that the equation (i') below is satisfied and x is from 5 to 25% by weight.

$$-0.1x+3 \leq y \leq -0.1x+5 \quad \text{(i')}$$

In the present description, the "aromatic ring content" stands for the content of aromatic ring moieties in the resin. Also, the "urea group content" stands for the content of —NHCONH— group in the resin.

The Mn of the thermoplastic polyurethane resin (A) in the present invention is, from the viewpoint of resin strength, preferably 4000 or more, and from the viewpoint of STi is preferably 40000 or less, more preferably from 8000 to 25000.

Mn is determined by the GPC method using N,N-dimethylformamide (hereinafter abbreviated as DMF) as a solvent.

The above-described resin (A) may be produced either by the one shot process that involves one-stage reacting a diisocyanate (a1) having the aforementioned symmetrical structure with a component containing active hydrogen [the aforementioned diamine (a2) and/or the aforementioned diol (a3), and the aforementioned high molecular-weight diol (a4) and, as required, a polymerization terminator (a5)]; or by the pre-polymer process that involves reacting a diol [the aforementioned high molecular-weight diol (a4) and, as necessary, the aforementioned diol (a3)] and, as appropriate, the polymerization terminator (a5) with an excessive diisocyanate (a1) to form a NCO-terminated urethane pre-polymer (hereinafter abbreviated as a Up), and then reacting the Up with the residual active hydrogen-bearing component [a diamine (a2) and/or a diol (a3) and, as required, the polymerization terminator (a5)]. The pre-polymer process is preferable.

The aforementioned resin (A) is preferably obtained as a powder. Methods of obtaining a powder of the resin (A) include ① a method that involves grinding the resin (A) of a block or a pellet obtained by the aforementioned process by means of the refrigeration grinding method, the freeze grinding method, or the like to yield a powder of the resin (A); ② a method that involves dispersing a Up obtained by reacting the aforementioned high molecular-weight diol (a4) and, as required, the aforementioned diol (a3) and/or the aforementioned polymerization terminator (a5) with the aforementioned excessive diisocyante (a1) in the absence of solvent or in the presence of solvent by means of a high speed agitator in water containing a dispersing stabilizer, and reacting the resultant material with water and/or a diamine (a2) and, as required, the polymerization terminator (a5); ③ a method that involves dispersing a Up obtained as in ② in the absence of solvent or in the presence of solvent in a non-water-based dispersing solvent (hexane, heptane or the like) containing a dispersing stabilizer, and subsequently reacting the resulting material with a diamine (a2) and as necessary the polymerization terminator (a5); and the like. In these methods of ① to ③, the polymerization terminator (a5) may be added either in the production of pre-polymer or in the production of urethane resin. Of these methods, a particularly preferred method of production is the method of ②.

In the above-described methods of ② and ③, based on 100 parts by weight of a mixture (M) of a Up, the aforementioned diamine (a2) and as necessary the aforementioned polymerization terminator (a5), the amount of a dispersing stabilizer solution made up of a dispersing stabilizer and water or a non-water-based dispersing solvent is preferably 50 parts by weight or more from the viewpoint of a dispersed state of mixture (M) and the particle size of the resultant resin powder, more preferably from 100 to 1000 parts by weight. Also, as required, heat may be applied (e.g., 40 to 100° C.) to make a viscosity of the mixture (M) lower, and an organic solvent inactive to isocyanate, such as a ester-based solvent, a ketone-based solvent, a chlorine-based solvent, or an aromatic solvent may be added. The revolution number of a high speed dispersing machine is preferably at least 1000 rpm, more preferably from 3000 to 10000 rpm.

In this case, although the aforementioned diamine (a2) and as required the aforementioned polymerization terminator (a5) may be added after a Up is dispersed in water, or it may be added immediately prior to the dispersion of the Up, in the sense that the reaction proceeds more homogeneously, the latter is preferable.

The aforementioned polymerization terminators (a5) include, for example, monohydric alcohols having a carbon number of 1 to 12 (methanol, ethanol, n-butanol, n-octanol, 2-ethylhexanol, cellosolve, alkylene oxide adducts of phenol, and the like), monoamines having a carbon number of 1 to 12 [diethylamine, dibutylamine (hereinafter abbreviated DBA), diethanol amine, and the like], and the like. Of these, monohydric alcohols are preferable, and n-octanol and 2-etylhexanol are particularly preferable.

In an urethanization reaction, as required, a known catalyst can be used. Illustrative examples of the catalyst include organic metal compounds [tin-based catalysts, such as dibutyltindilaurate, dioctyltindilaurate, stannous octate, and the like; lead-based catalysts such as lead octenate, and the like]; amines [triethylamine, triethylenediamine, diazabicycloundecene (product of San-Apro Ltd., DBU), and the like]; combinations of two species thereof or more, and the like. The amount of use of the catalyst is not particularly limited, but is preferably from 0.001 to 0.05 part by weight based on 100 parts by weight of the above-described resin (A).

Also, in an urethanization reaction, as required, a known solvent (THF, DMF, toluene, MEK, or the like) can be used.

The glass transition temperature (hereinafter abbreviated as Tg) of the above-described resin (A) is preferably from −60° C. to −35° C., more preferably from −45° C. to −35° C., for material for molding of the instrument panel skin integratedly having air bag door sections formed in such a way that a tear line for tear opening does not appear on the design face. Tg can be determined using a differential scanning calorimeter (hereinafter abbreviated as DSC).

The Tg of the resin (A) exceeds −35° C., tear opening is easily to take place particularly under low temperature conditions, or the like, even in portions other than the tear line upon air bag expansion. In addition, for the Tg of a polyurethane resin, −60° C. is said to be the lower limit.

Material for molding of the present invention may comprise the above-described resin (A) only, and further may contain the plasticizer (B) as well. Additionally, as required, in the resin (A) or in the resin (A) and the plasticizer (B) may be contained at least one of an internal release agent (C) for molding material of the slush molding polyurethane skin and an additive (D).

The aforementioned plasticizers (B) include, for example, phosphate esters; aromatic monocarboxylic acid diester of poly (polymerization degree 3 to 10) alkylene (carbon number 2 to 3) glycols; phthalates [dibutyl phthalate, dioctyl phthalate, dibutylbenzyl phthalate, isodecyl phthalate, and the like]; aliphatic dicarboxylates [di-2-ethylhexyl adipate, 2-ethylhexyl sebacate, and the like]; trimellitates [tri-2-ethylhexyl trimellitate, trioctyl trimellitate, and the like]; aliphatic esters [butyl oleate, and the like]; mixtures of two species thereof or more; and the like.

The preferred of the above-described plasticizer (B) is, from the viewpoint of humidity resistance, a phosphate ester, particularly the phosphate ester (B1) indicated by the general formula (5) below, and from the standpoint of low temperature properties, particularly tear opening properties of an air bag door in low temperature, is an aromatic monocarboxylic acid diester (B2) indicated by the general formula (7) below of poly (polymerization degree 3 to 10) alkylene (carbon number 2 to 3) glycols:

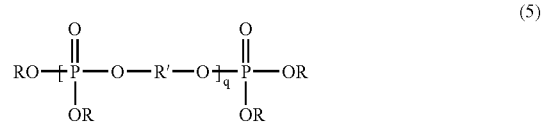

(5)

in the formula (5), R is independently a monovalent hydrocarbon group having a carbon number of 1 to 10, which may be substituted with a halogen, a plurality of Rs may be the same or different, R' is a divalent organic group having a carbon number of 2 to 15, which may be substituted with a halogen, and q is an integer of 1 to 6.

Examples of R include aliphatic hydrocarbon groups having a carbon number of 1 to 10 (a methyl group, an ethyl group, an isopropyl group, an n-butyl group, a t-butyl group, a hexyl group, and the like), aromatic hydrocarbon groups that may be substituted with an alkyl group having a carbon number of 1 to 4 (a phenyl group, a xylenyl group, a cresyl group, an ethylbenzyl group, a butylbenzyl group and the like), groups thereof that are substituted with a halogen, and the like. Preferably, R is a phenyl group, an alkylphenyl group, or a phenyl group substituted with a halogen.

Examples of R' include divalent aliphatic hydrocarbon groups having a carbon number of 2 to 15 (an ethylene group, a propylene group, an n-butylene group, a t-butylene group, a hexylene group, and the like), divalent aromatic hydrocarbons, which may contain a sulfur atom or an oxygen atom, having a carbon number of 6 to 15 [a phenylene group, a biphenylene group, -Ph-CH$_2$-Ph-, -Ph-C(CH$_3$)$_2$-Ph-, -Ph-SO-Ph- (Ph indicates a phenyl group), residues excluding a hydroxyl group from bisphenols (bisphenol A, bisphenol F, bisphenol S, and the like), and the like], groups thereof substituted with a halogen, and the like.

The preferred include divalent aromatic hydrocarbons, which may contain sulfur or oxygen atom, having a carbon number of 6 to 15.

Of these illustrated as the above-described phosphate esters (B1), the particularly preferred include plasticizers indicated by the general formula (5) in which R is a phenyl group, an alkylphenyl group or a phenyl group substituted with a halogen, and R' is denoted by the general formula (6) below:

in the formula (6), Ph' represents a 1,4-phenylene group, p is 0 or 1, and A represents a direct bonding, a methylene group, an isopropylidene group or SO.

The aforementioned aromatic monocarboxylic acid diesters (B2) include compounds indicated by the following general formula (7):

wherein $R^1$ and $R^2$ are the same or different aromatic monocarboxylic acid residues, T is an alkylene group having a carbon number of 2 to 4, and n is an integer of 1 to 10.

Examples of $R^1$ and $R^2$ include aromatic hydrocarbon groups (a phenyl group, a tolyl group, a xylenyl group, a 4-butylphenyl group, a 2,4-dibutylphenyl group, a 2-methyl-4-chlorophenyl group, a nonylphenyl group and the like) that may be nuclear substituted (substitution degree 1 to 3) with alkyl groups having a carbon number of 1 to 10 and/or a halogen (Cl, Br and the like).

In addition, examples of the T include straight chain or branched alkylene groups having a carbon number of 2 to 4 (an ethylene group, 1,2- and 1,3-propylene groups, 1,2-, 2,3-, 1,3-, 1,4-butylene groups, and the like) and these groups substituted with a halogen (a 1-chloromethylethylene group, a 1-bromomethylethylene group and the like).

Illustrative examples of the aromatic monocarboxylic acid diester (B2) include polyethylene glycol (polymerization degree 3 to 10) dibenzoate, polypropylene glycol (polymerization degree 3 to 10) dibenzoate, and the like.

The aforementioned phosphate ester (B1) and aromatic monocarboxylic acid diester (B2) are each used singly or in combination or in combination with one species or more of the aforementioned other plasticizers exclusive thereof. When used in combination, particularly in the case of the phosphate ester (B1) from the viewpoint of moisture-absorption property resistance, in the case of the aromatic monocarboxylic diester (B2) from the viewpoint of low temperature properties, particularly tear opening properties of an air bag door in low temperature, the content of phosphate ester (B1) or aromatic monocarboxylic acid diester (B2) in the aforementioned plasticizer (B) is desirably 50% by weight or more, particularly desirably 70% by weight or more.

In a material for slush molding of the present invention, the blending ratio of the aforementioned plasticizer (B) is preferably 80 parts by weight or less based on 100 parts by weight of the above-described resin (A), more preferably from 2 to 70 parts by weight, still more preferably from 5 to 50 parts by weight. The blending ratio of the plasticizer (B), from the standpoint of melt viscosity during molding, 2 parts by weight or more is more preferable, and from the standpoint of bleeding out over time, 80 parts by weight or less is preferable.

The aforementioned internal release agent (C) is preferably at least one species selected from the group consisting of fluorine-modified phosphates (salts) (f) indicated by the general formula (11) and modified silicones containing a polar group (c):

the modified silicones containing a polar group (c) being at least one species selected from the group consisting of carboxyl-modified organopolysiloxanes (c1) expressed by the general formula (8), epoxy-modified organopolysiloxanes (c2) expressed by the general formula (9), and ether-modified organopolysiloxanes (c3) expressed by the general formula (10).

This species can improve the problem of difficulty with respect to the compatibility of a sufficient release effect and adhesion properties of the surface and polyurethane foam in the conventional internal release agent. The fluorine-modified phosphates (salts) represent fluorine-modified phosphates or salts thereof.

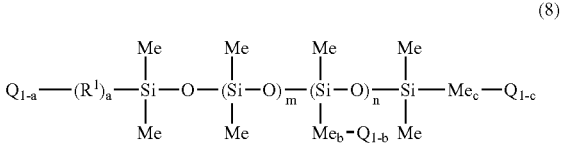

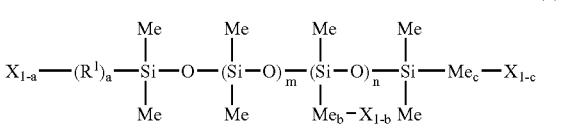

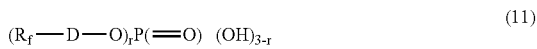

In the formulas (8) to (10), Q is a carboxyl group indicated by —$R_2$COOH—, X is an epoxy group indicated by

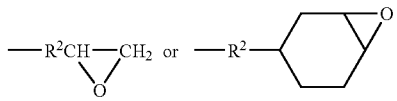

Z is a polyether group indicated by

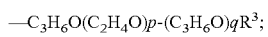

$R^1$ is an alkyl group having a carbon number of 1 to 4, $R^2$ is an alkylene group having a carbon number of 1 to 4, $R^3$ is H, an alkyl group having a carbon number of 1 to 4, or an acetyl group, and Me is a methyl group; a, b, and c are 0 or 1 each independently with the proviso that when a=1 and b=1, then c=0; m and n are numbers that satisfy the conditions that (m+n) is from 10 to 200 and n/(m+n) is from 0 to 0.5; p and q are numbers that satisfy the conditions that (p+q) is from 3 to 100, and p/(p+q) is from 0 to 0.6.

Additionally, in the formula (11), Rf is a perfluoroalkyl group having a carbon number of 4 to 20; D is a divalent organic group indicated by —$CH_2CH(E)CsH_{2s}$— or —$SO_2N(R^4)C_tH_{2t}$—, wherein E is H, $CH_3$, $C_2H_5$, $C^1$ or $OR^5$ ($R^5$ is H, $CH_3$, $C_2H_5$, $COCH_3$, $COC_2H_5$, or $CH_2COOH$ or salts thereof), s is an integer of 0 to 4, $R^4$ is an alkyl group having a carbon number of 1 to 4, and t is an integer of 1 to 4; and r is an integer of 2 or 3.

In each of the formulas (8) to (11), $R^1$ is, in terms of release properties, an alkyl group that preferably has a carbon number of 1 to 4 (more preferably from 1 to 3). $R^2$ is preferably, from the viewpoint of release properties, an alkylene group that preferably has a carbon number of 1 to 4 (more preferably from 1 to 3).

$R^3$ is, from the viewpoint of release properties, H or, an alkyl group or an acetyl group that preferably has a carbon number of 1 to 4 (more preferably from 1 to 3).

M and n are numbers that preferably meet the conditions that (m+n) is, from the viewpoint of release properties, preferably 10 or more, and from the viewpoint of adhesion properties between skin and foam in polyurethane foam with a skin described below, is preferably 200 or less (more preferably from 25 to 100), and n/(m+n) is, from the viewpoint of release properties, from 0 to 0.5 (more preferably from 0.1 to 0.45).

P and q are numbers that preferably meet the conditions that (p+q) is, from the viewpoint of adhesion properties between skin and foam, preferably 2 or more, from the viewpoint of release properties, 100 or less (more preferably from 3 to 60), and p/(p+q) is preferably 0.01 or more, and is, from the viewpoint of skin moisture absorption property resistance, 0.6 or less (more preferably from 0.05 to 0.3).

A, b, and c are 0 or 1 [however, the case where a=1, b=1, and c=1 is excluded [the compound is not a modified species made up of organic groups (carboxyl group, epoxy group or ether group)]], modified silicones include the following types.

[1] Side chain type: the case where a=1, b=0, and c=1; a type in which an organic group is introduced to the side chain of an organopolysiloxane.

[2] Both terminal type: the case where a=0, b=1 and c=0; a type in which an organic group is introduced to both terminals of an organopolysiloxane.

[3] One terminal type: the case where a=1, b=1 and c=0, or a=0, b=1, c=1; a type in which an organic group is introduced to one terminal of an organopolysiloxane.

[4] Side chain both terminal type: the case where a=0, b=0, c=0; a type in which organic groups are introduced to the side chain and both terminals of an organopolysiloxane.

[5] Side chain one terminal type: the case where a=1, b=0 and c=0, or a=0, b=0, c=1; a type in which organic groups are introduced to the side chain and one terminal of an organopolysiloxane.

[6] Mixed type: Mixed types of two species or more selected from the above-mentioned [1] to [5].

Of the carboxyl-modified organopolysiloxane (c1) indicated by the aforementioned general formula (8), the preferred from the viewpoint of release properties include the side chain type (c11), the both terminal type (c12), the mixed type (c16), and more preferred is the mixed type (c16).

Illustrative examples of the side chain type (c11) preferably include species that have a carboxyl equivalent of 3,000 to 4,000, (m+n) is from 20 to 200, and n/(m+n) is from 0.01 to 0.1, e.g., trade name X22-3701E [product of Shin-Etsu Chemical Co., Ltd.], trade name SF8418 [product of Dow Corning Toray Silicone Co., Ltd.] and the like, and more preferably include X-22-3701E.

Preferred examples of the both terminal type (c12) include species that have a carboxyl equivalent of 800 to 1,500, (m+n) is from 10 to 100, and n/(m+n) is 0, e.g., trade name X-22-162A [product of Shin-Etsu Chemical Co., Ltd.], and the like.

Preferred examples of the mixed type (c16) include species that have a carboxyl equivalent of 1,000 to 1,500, (m+n) is from 10 to 100, and n/(m+n) is from 0 to 10, e.g., trade name X-22-3710 [product of Shin-Etsu Chemical Co., Ltd.], and the like.

Of the epoxy-modified organopolysiloxane (c2) indicated by the aforementioned general formula (9), the preferred from the viewpoint of release properties include the side chain type (c21).

Illustrative examples of the side chain type (c21) preferably include species that have an epoxy equivalent of 2,500 to 4,500, (m+n) is from 10 to 200, and n/(m+n) is from 0.1 to 0.5, e.g., trade name KF-1001, KF-101, KF-102 [all products of Shin-Etsu Chemical Co., Ltd.], trade name SF8411 and SF8413 [all products of Dow Corning Toray Silicone Co. Ltd.], and the like, and more preferably include KF-1001 and KF-102.

Of the ether-modified organopolysiloxane (c3) indicated by the aforementioned general formula (10), the preferred from the viewpoint of release properties include the side chain type (c31).

Preferred examples of the side chain type (c31) include species that have (m+n) of from 10 to 50, and n/(m+n) of from 0.05 to 0.5, e.g., trade name FZ-2222 and FZ-2164 [both products of Nippon Unicar Co., Ltd.], and the like.

The aforementioned fluorine-modified phosphates (salts) (f) are expressed by the aforementioned general formula (11), and examples of the fluorine-modified phosphate include the following.

(a) A mixture having i=3 or more, indicated by $[(CF_3)_2CF(CF_2CF_2)iCH_2CH(OH)CH_2O]_r PO(OH)_{3-r}$ (b) $[C_8F_{17}SO_2N(C_2H_5)CH_2CH_2O]_r PO(OH)_{3-r}$ (c) $[C_7F_{15}CH_2CH_2O]_r PO(OH)_{3-r}$ (d) A mixture having i=3 or more, indicated by $[(CF_3)_2CF(CF_2CF_2)iCH_2CH_2CH_2O]n PO(OH)_{3-r}$ (e) $[(CF_3)_2CF(CF_2CF_2)_3CH_2CH(Cl)CH_2O]_r PO(OH)_{3-r}$ (f) $[(CF_3)_2CF(CF_2CF_2)_3CH_2CH(CH_3)O]_r PO(OH)_{3-r}$ (g) $[(CF_3)_2CF(CF_2CF_2)_3CH_2CH(OCH_2COOH)CH_2O]_r PO(OH)_{3-r}$ In addition, illustrative examples of the fluorine-modified phosphate ester include alkaline metals (sodium, potassium, and the like) salts, ammonium salts, amine salts, and the like.

Of the aforementioned fluorine-modified phosphate (salt), the preferred from the viewpoint of release properties include a phosphate ester in which Rf is a perfluoroalkyl group having a carbon number of 7 to 20, D has an alkyl group or a polar atomic group such as OH, $-OCH_2COOH$, $-SO_2N(R)-$, and each of s and t is an integer of 1 to 3, and salts thereof, e.g., trade name Sumimold FA [product of Sumico Lubricant Co., Ltd.].

Of the aforementioned internal release agent (C), the preferred from the viewpoint of release properties include carboxy-modified organopolysiloxanes (c1) (in this paragraph, hereinafter (c1)) or ether-modified organopolysiloxanes (c3) (in this paragraph, hereinafter (c3)), or a combination of at least one species selected from the group consisting of (c1), epoxy-modified organopolysiloxanes (c2) and (c3) and fluorine-modified phosphates (salts) (f), more preferred include a combination comprising (c1) and (c3), particularly preferred include a combination comprising the mixed type of (c1) and the side chain type of (c3).

The amount of use of the internal release agent (C) based on the weight of the resin (A) is, from the viewpoint of release properties and adhesion properties to polyurethane foam, preferably from 0.01 to 5% by weight, more preferably from 0.1 to 2% by weight.

A method of containing the internal release agent (C) in the resin (A) may be blending the internal release agent (C) with a powder of the resin (A), or containing the agent in urethane polymer in advance during forming the resin (A). The preferred from the viewpoint of release properties is the method of blending the internal release agent (C) with a powder of the resin (A).

Examples of the additive (D) include pigments, stabilizers, and other additives.

The pigments are not particularly limited, and can include, for example, known organic pigments and/or inorganic pigments for use. The amount of blend of the pigment is preferably from 0 to 5 parts by weight based on 100 parts by weight of the above-described resin (A).

The organic pigments include, for example, insoluble azo pigments, soluble azo pigment, copper phthalocyanine-based pigments, quinacridone-based pigments, and the like; the inorganic pigments include, for example, chromates, ferrocyanides, metal oxides, selenium sulfide compounds, metal salts (sulfates, silicates, carbonates, phosphates, and the like), metal powders, carbon black, and the like.

The stabilizers are not particularly limited and can include, for example, known antioxidants and/or ultraviolet absorbers for use. The amount of blend of the stabilizer is preferably from 0 to 5 parts by weight based on 100 parts by weight of the above-described resin (A).

The antioxidants include, for example, phenol-based antioxidants [2,6-di-t-butyl-p cresol, butylated hydroxyanisol, and the like]; bisphenol-based antioxidants [2,2'-methylenebis(4-methyl-6 t-butylphenol, and the like); phosphorus-based antioxidants [triphenylphosphite, diphenylisodecylphosphite, and the like], and the like.

The ultraviolet absorbers include, for example, benzophenone-based absorbers [2,4-dihydroxybenzophenone, 2-hydroxy-4-methoxybenzophenone, and the like]; benzotriazole-based absorbers [2-(2'-hydroxy-5'-methylphenyl)benzotriazole, and the like], salycilates (phenylsalycilate, and the like]; hindered amine-based absorbers [bis(2,2,6,6-tetramethyl-4-piperidine)sebacate, and the like], and the like.

The other additives include, for example, blocking inhibitors, external release agents, flame retardants, and the like.

The blocking inhibitors are not particularly limited, and can include known inorganic blocking inhibitors, organic blocking inhibitors, for use. The inorganic blocking inhibitors include, for example, silica, talc, titanium oxide, calcium carbonate, and the like; the organic blocking inhibitors include, for example, thermosetting resins having a particle diameter of 10 µm or less (thermosetting polyurethane resin, guanamine-based resin, epoxy-based resin, and the like), thermoplastic resins having a particle diameter of 10 µm or less (thermoplastic polyurethane resin, poly(meth)acrylate resin, and the like), maleimide phthalate powder, and the like.

The amount of blending of the blocking inhibitor is preferably from 0 to 2 parts by weight based on 100 parts by weight of the above-described resin (A).

The external release agents are not particularly limited, and include known external release agents for use, for example, fluorine-based release agents (fluoroalkyl phosphates, and the like), silicon-based release agents (dimethylpolysiloxane, amino-modified dimethylpolysiloxanes, carboxyl-modified dimethylpolysiloxane, and the like), fatty acid ester-based release agents (alkane (carbon number 11 to 24)acid alkenyl (carbon number 6 to 24) esters, and the like), phosphate-based release agents (tributyl phosphate), and the like. The amount of blending of the external release agent is from 0 to 2 parts by weight based on 100 parts by weight of the above-described resin (A).

The flame retardants are not particularly limited and can include known flame retardants, for example, phosphate-based, hydrogen halide-based flame retardants, and the like, for use.

The phosphate-based flame retardants include, for example, tricresyl phosphate (TCP), tris(β-chloroethyl) phosphate, tris(dichloropropyl) phosphate, tris(dibromopropyl) phosphate, bromophosphate, and the like. The halogenated hydrocarbon-based flame retardants include, for example, chlorinated paraffin, and ethylene tetrabromide. The halogenated hydrocarbon-based flame retardant is preferably used along with antimony oxide, zinc borate, or the like. The amount of blending of the flame retardant is preferably from 0 to 20 parts by weight based on 100 parts by weight of the above-described resin (A).

The total amount of blending of the additives (D) is preferably from 0 to 34 parts by weight based on 100 parts by weight of the above-described resin (A), more preferably from 0.05 to 20 parts by weight.

A method for producing material for slush molding of the present invention is not particularly limited, but when the aforementioned plasticizer (B) and the above-mentioned additive (D) are contained, for example, the methods below can be illustrated.

① A method of blending a powder of the above-described resin (A), the plasticizer (B) and the additive (D) in the lump by means of a mixer.

② A method that involves blending the plasticizer (B) with the additive (D) in advance, and then blending a powder of the resin (A) therewith.

③ A method of causing a portion or all of the plasticizer (B) and the additive (D) to be contained in advance at an arbitrary stage in producing a powder of the resin (A).

Of these, from the standpoint of simplification of manufacturing step, the method of ② is preferable.

When the aforementioned internal release agent (C) is used, it may be in advance blended with a powder of the resin (A), or may be blended with a powder of the resin (A) along with the plasticizer (B) and the additive (D).

In the present invention, an apparatus of producing material for slush molding is not particularly limited, a known powder mixing apparatus can be employed.

The powder mixing apparatuses include, for example, a high speed shearing mixing apparatus [Henschel Mixer (registered mark), or the like], a low speed mixing apparatus [Nauta Mixer (registered mark), planetary mixer, or the like], and the like.

The volume average particle diameter of material for slush molding of the present invention, in terms of powder flowability and of the property that the powder enters fine portions of the mold in slush molding, is preferably 100 µm or more, particularly preferably 130 µm or more, from the viewpoint of occurrence of pin holes on the molded skin, is preferably 500 µm or less, particularly preferably 200 µm or less.

In addition, the ratio of particles having a particle diameter of 75 µm or less, from the standpoint of operation environments due to powder dust and powder flowability and of powder entering fine portions of the mold in slush molding, is preferably 20% by weight or less, particularly preferably 15% by weight or less.

In the present description, the volume average particle diameter is a particle diameter value of particles of undersize fraction of 50% as determined by a laser light scattering method. The measuring apparatuses can include, for example, a Microtrack HRA particle size analyzer 9320-X100 (product of Nikkiso Co., Ltd.).

To mold material for molding of the present invention using the slush molding method, for instance, a method can suitably be carried out that involves swing rotating both a box containing powder-like material for molding of the present invention and a mold heated to 200 to 280° C., melt flowing the powder in the mold and then cooling solidifying to produce the skin.

An example of the procedure of the slush molding method of the present invention is shown in the following.

First, to a mold, as necessary, a known external release agent that is ordinarily used (fluorine compound type release agent, silicone compound type release agent, or the like) is applied at 60° C. or less by a method such as air spraying, or brush painting, and this mold is heated (200 to 300° C.) by heated sand heating, oil heating or the like. Then, the box containing the material for molding of the present invention is closely adhered to the mold and rotated to introduce the material for molding into a cavity. After rotation (powder adhering) for 5 to 45 seconds, the excessive material for molding is removed, and further the material for molding is maintained for 60 to 300 seconds, preferably for 70 to 120 seconds to thereby complete the melt of the material for molding. Thereafter, the mold is cooled by water cooling method or the like and demolded to obtain a slush molded body.

The thickness of the skin molded with material for molding of the present invention is preferably from 0.5 to 1.5 mm. The skin is suitably used for interior material for an automobile such as skins of an instrument panel, a door trim, and the like.

Material for molding an instrument panel skin of the present invention is appropriate for an automobile instrument panel skin integratedly having air bag door sections formed such that the tear line for tear opening does not appear on the design face. An instrument panel skin formed with material for skin molding of the present invention integratedly has air bag door sections, and has a tear line for tear opening formed not to appear on the design face in air bag door sections.

Examples of the instrument panel skin include one disclosed in Japanese Unexamined Patent Application Publication No. 10-86703. In place of polyvinyl chloride disclosed therein, the skin can be similarly molded using material for skin molding of the present invention.

The production of an instrument panel skin of the present invention can appropriately be performed by a method of production comprising a step of heat molding the aforementioned material, and a step of forming a tear line for tear opening in the molded material obtained in the above-mentioned step in such a way that the tear line does not appear on the design face.

The above-described step of heat molding is not particularly limited, and a known method can be used. For instance, it may also be the slush molding step conducted in normally producing an instrument panel skin.

The above-described step of forming a tear line is not particularly limited, and a known method can be used. For instance, it may also be the step of forming the line on the back side of an instrument panel by means of laser processing, blade pressing force processing, or the like.

For this tear line, the tear opening of skin material takes place along the tear line upon air bag expansion.

EXAMPLES

Hereinafter, in terms of Production Examples and Examples, the present invention will be set forth further in detail, but the present invention is by no means limited to these.

With species used in the examples below, polyol I is PBA having an Mn of 1000, polyol II is PHIP having an Mn of 900, polyol III is polyethylene adipate having an Mn of 2000, stabilizer I is Irganox 1010 available from Ciba Specialty Chemicals, titanium oxide is Tipaque R-820 available from Ishihara Sangyo Co., Ltd., dispersing agent I is Sansparl PS-8 available from Sanyo Chemical Industries Ltd., ketimine I is MEK ketimine of HAD, ketimine II is MEK ketimine of hydrogenated MDA, ketimine III is MEK ketimine of isophoronediamine, dispersing machine I is an Ultradisperser available from Yamato Scientific Co., Ltd., plasticizer I is CR741 available from Daihachi Chemical Industry Co., Ltd. [phosphate ester expressed by the general formula (5), wherein R is a phenyl group, q is 1, and R' is -Ph-isopropylidene-Ph-], plasticizer II is Sansoft EB300 from Sanyo Chemical Industries Ltd., the internal release agent is X22-3710 from Shin-Etsu Chemical Co., Ltd. [carboxyl-modified organopolysiloxane], blocking inhibitor I is maleimide phthalate resin powder (volume average particle diameter 3 μm, melting point 280° C.)

Production Examples 1 to 8

In accordance with the formula (parts by weight. expressed in terms of parts in the Table) described in Table 1, as in the following, solutions of a Up (Up1 to Up8) were produced.

In a reaction vessel fitted with a thermometer, a stirrer and a nitrogen-blowing tube were placed a polyol, a low molecular-weight diol and 1-octanol, and the air inside was substituted with nitrogen, and then the resulting mixture was heated to 110° C. while stirring to be melted. Then, a diisocyanate was introduced therein, and the resulting mixture was reacted at 85° C. for 6 hours to form an NCO terminated Up. Subsequently, the Up was cooled to 60° C., and THF, a stabilizer and titanium oxide were added thereto (in Up7, DBA was added after cooling to 60° C.) and was homogeneously mixed to yield the Up solution. The NCO contents (% by weight. Expressed in terms of % in the Table) of these Up solutions are shown together in Table 1.

TABLE 1

| | Production Example | | | | | | | |
|---|---|---|---|---|---|---|---|---|
| | 1 | 2 | 3 | 4 | 5 | 6 | 7 | 8 |
| Polyol I (parts) | 575 | 950 | 800 | 100 | 946 | 200 | — | 570 |
| Polyol II (parts) | 383 | — | — | 810 | — | 720 | — | 387 |
| Polyol III (parts) | — | — | — | — | — | — | 1271 | — |
| 1-Octanol (parts) | 16.8 | 17.2 | 21 | 16.6 | 16.7 | 18.3 | — | 17.6 |
| DBA (parts) | — | — | — | — | — | — | 21 | — |
| BG (parts) | — | 4.5 | 18 | — | — | — | — | — |
| HG (parts) | — | — | — | — | — | — | 42 | — |
| MPD (parts) | — | — | — | — | 11.9 | — | — | — |
| HDI (parts) | 242 | 242 | — | 244 | 244 | 307 | 214 | 244 |
| Hydrogenated MDI | — | — | 490 | — | — | — | — | — |
| THF (parts) | 217 | 217 | 238 | 209 | 227 | 223 | 277 | 218 |
| Stabilizer I (parts) | 2.5 | 2.5 | 3.1 | 2.4 | 2.4 | 2.7 | 3.1 | 2.6 |
| Titanium oxide (parts) | 15.3 | 12.6 | 15.3 | 12.2 | 15.2 | 13.3 | 15.7 | 12.8 |
| Up No. | Up1 | Up2 | Up3 | Up4 | Up5 | Up6 | Up7 | Up8 |
| NCO content (%) | 2.2 | 2.2 | 4.2 | 2.3 | 2.2 | 4.3 | 0.9 | 2.2 |

Production Example 9

Production of an MEK Ketimine Compound of a Diamine

While refluxing a diamine and excessive MEK (4 times in mole amount relative to the amount of the diamine) at 80° C. for 24 hours, water generated was removed to the outside of the system. Then, under a reduced pressure, unreacted MEK was removed to obtain ketimine I to III, i.e., MEK ketimine compounds.

Production Examples 10 to 14 and Comparative Production Examples 1 to 3

Into a reaction vessel, in accordance with the formulation described in Table 2 (parts by weight. Expressed in terms of parts in the Table), a Up and ketimine were loaded, and thereto was added 340 parts by weight of aqueous solution in which 1.3 parts by weight of dispersing agent I was dissolved, and the resulting solution was blended using dispersing machine I at 9000 rpm for one minute. This mixture was transferred into a reaction vessel equipped with a thermometer, a stirrer, and a nitrogen-blowing tube and the air inside was substituted with nitrogen, and then the resulting mixture was reacted at 50° C. for 10 hours with agitation. After completion of the reaction, the solution was filtration separated and dried to produce powders of polyurethane resins (F1 to F8).

The Mn, STi (° C.), ΔST (° C.), hard segment contents (calculated values) (% by weight), urea group contents (% by weight), aromatic ring contents (% by weight) and volume average particle diameters (μm) of the obtained resin were shown in Table 2.

TABLE 2

|  | Production Example | | | | | Comparative Production Example | | |
|---|---|---|---|---|---|---|---|---|
|  | 10 | 11 | 12 | 13 | 14 | 1 | 2 | 3 |
| Up No. | Up1 | Up2 | Up3 | Up4 | Up5 | Up6 | Up7 | Up8 |
| (parts) | 100 | 100 | 100 | 100 | 100 | 100 | 100 | 100 |
| Ketimine No. | I | I | II | I | I | I | I | III |
| (parts) | 5.6 | 5.6 | 16.9 | 5.8 | 5.6 | 11.1 | 2.2 | 5.7 |
| Resin No. | F1 | F2 | F3 | F4 | F5 | F6 | F7 | F8 |
| Mn × 1000 | 25 | 23 | 26 | 24 | 24 | 25 | 26 | 24 |
| STi | 161 | 140 | 172 | 170 | 160 | 219 | 118 | 89 |
| ΔST | 19 | 20 | 27 | 25 | 27 | 37 | 6 | 52 |
| Hard segment content | 22.3 | 22.7 | 45.7 | 23.4 | 23.3 | 29.2 | 17.4 | 23.7 |
| Urea group content | 3.3 | 3.3 | 5.7 | 3.5 | 3.3 | 6.3 | 1.9 | 3.3 |
| Aromatic ring content | 8.0 | 0 | 0 | 17.5 | 0 | 14.2 | 0 | 7.9 |
| Volume average particle diameter | 151 | 150 | 150 | 154 | 152 | 150 | 153 | 154 |

Examples 1 to 3 and 5 and Comparative Examples 1 to 4

A mixture of 100 parts by weight of resin powder indicated in Table 3, 15 parts by weight of plasticizer 1 and 0.05 parts of X22-3710 (carboxyl-modified organopolysiloxane, product of Shin-Etsu Chemical Co., Ltd.) as the internal release agent was loaded into a Henschel Mixer and the material was blended at 200 rpm for one minute. In Comparative Example 4, a commercially available polyvinyl chloride powder for slush molding (designated as S-130) [Tg: −60° C., STi: 160° C., ΔST: 20° C.] instead of polyurethane resin powder was used to obtain material S9.

After mixing, the mixture was aged at 80° C. for two hours and then cooled to 40° C. Thereto was added 1 part by weight of blocking inhibitor I to produce materials (S1 to S3, and S5 to S9) for slush molding, having the volume average particle diameters (μm) and contents (% by weight) of fine particles with a particle diameter of 75 μm or less indicated in Table 3.

Example 4

A mixture of 100 parts by weight of resin powder indicated in Table 3, 15 parts by weight of plasticizer II and 0.05 parts of X22-3710 (carboxyl-modified organopolysiloxane, product of Shin-Etsu Chemical Co., Ltd.) as the internal release agent was loaded into a Henschel Mixer and the material was blended at 200 rpm for one minute.

After mixing, the mixture was aged at 80° C. for two hours and then cooled to 40° C. Thereto was added 1 part by weight of blocking inhibitor I to produce material (S4) for slush molding, having the volume average particle diameter (μm) and a content (% by weight) of fine particles with a particle diameter of 75 μm or less indicated in Table 3.

Materials S1 to S8 thus obtained were subjected to the determination of the leveling time (seconds).

Also, with a mold into which Sumimold FA [product of Sumico Lubricant Co., Ltd.] was sprayed and which was heated to 250° C. was contacted material (S1 to S9) for slush molding for 30 seconds and heat melted, and then the resulting material was allowed to stand at room temperature for one minute and water cooled to prepare a molded sheet. The molded sheets obtained using materials S1 to S9 were subjected to the testing of melt properties and heat resistance. The results are shown in Table 3.

In addition, with each of the molded sheets of S1 to S9 thus obtained being set within the mold, to each sheet was added an urethane foam forming component [made up of 95 parts of EO chipped polypropylenetriol (number average molecular weight 5,000), 5 parts of triethanolamine, 2.5 parts of water, 1 part of triethylamine and 61.5 parts of polymeric MDI] and each resulting material was foamed and closely adhered to obtain urethane foam molded bodies having each skin layer of S1 to S9. These molded bodies were heat treated within a circulating air drying machine at 120° C. for 500 hours and then urethane foam was removed from the molded body. Each molded sheet (skin layer) before and after heat treatment was subjected to the performance tests (Tg and the bending test). Further, the degree of shrinkage was determined as well. The results are shown in Table 3.

TABLE 3

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| Resin No. |  | F1 | F2 | F3 | F4 | F5 | F6 | F7 | F8 | S-130 |
| Material No. |  | S1 | S2 | S3 | S4 | S5 | S6 | S7 | S8 | S9 |
| Volume average particle diameter |  | 159 | 158 | 161 | 158 | 157 | 158 | 160 | 161 | 140 |
| Content of fine particles (%) |  | 13 | 14 | 15 | 14 | 13 | 14 | 13 | 13 | 3 |
| Leveling time |  | 85 | 68 | 78 | 78 | 87 | ≧600 | 38 | 97 | — |
| Melt properties |  | 4th grade | 5th grade | 4th grade | 4th grade | 4th grade | 1st grade | 5th grade | 4th grade | — |
| Heat resistance |  | ◎ | ◎ | ○ | ◎ | ○ | —* | X | X | — |
| Tg (° C.) | Before heat treatment | −37 | −49 | −49 | −45 | −46 | −27 | −49 | −38 | −60 |
|  | After heat treatment | −44 | −55 | −55 | −38 | −52 | −33 | −55 | −45 | −30 |
| Bending test | Before heat treatment | ○ | ○ | ○ | ○ | ○ | X | ○ | ○ | ○ |
|  | After heat treatment | ○ | ○ | ○ | ○ | ○ | X | ○ | ○ | X |
| Degree of shrinkage (%) |  | 0 | 0 | 0 | 0 | 0 | 0 | 0 | 0 | 5 |

<Measurement Methods>

(1) Measurement Method of STi and STe

Figure 2:
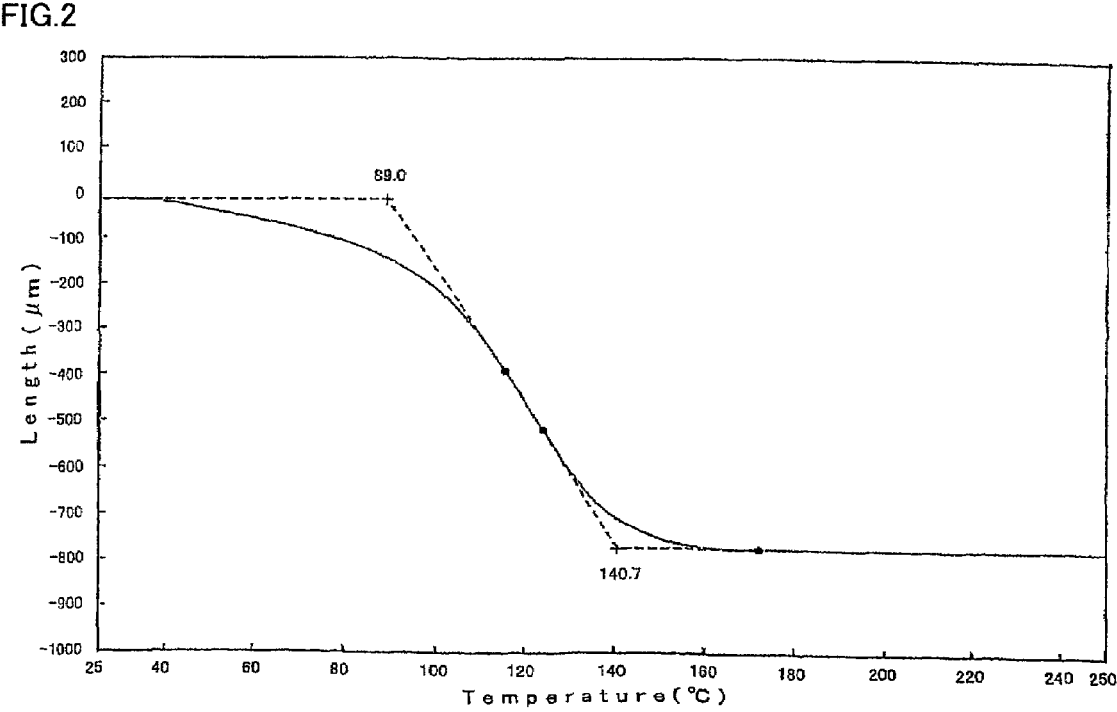
FIG. 2 is a TMA chart of an urethane resin powder (F8) used in Comparative Example 3.

Thermoplastic urethane resin powder was press molded at 190° C. for 2 minutes to form a film having a film thickness of 800 to 1200 μm. The sample of this film was determined for an STi and an STe by means of a thermomechanical analysis apparatus [Thermoflex TMA 8140] and [TAS 100] (products of Rigaku Corp.) using a thermomechanical analysis penetration mode (hereinafter denoted as a TMA). In a TMA chart, in accordance with [JIS K7121-1987, p-5, FIG. 3, stepped change], an STi was determined by the same method as for the extrapolation glass transition starting temperature (Tig, ° C.) and an STe was determined by the same method as for the extrapolation glass transition ending temperature (Teg, ° C.) (TMA measurement conditions: rate of temperature rise 5° C./min, load 5 g, needle diameter 0.5 mm). Also, the TMA charts of the resultant resin powders (F1) and (F8) are shown in FIGS. 1 and 2. The temperatures of the cross points of the tangent lines (broken lines) of the TMA curves (solid lines) in the Figures correspond to the STi and STe. ΔST=STe−STi.

(2) Melt Properties

The melt conditions of the mold-side face of a molded sheet and back face thereof were visually observed and evaluated on the basis of the following 5 grades.

5th grade: The mold-side face is completely melted. The back face is homogeneously melted, flat and glossy.

4th grade: The mold-side face is completely melted. The back face is homogeneously melted, but slightly has unevenness.

3rd grade: The mold-side face is completely melted. A portion of the back face has a residue of non-melt powder.

2nd grade: The mold-side face is insufficiently melted. The back face has many residues of non-melt powder.

1st grade: The material is not melted at all.

(3) Leveling Time

A ground steel plate was placed on a hot plate heated to 190° C. and thereon was dropped a sample powder of 10 to 14 mg with a microspatula. The dropped area is made 4 mm×8 mm. The time (seconds) required until sample powder dropped on the ground steel plate is completely melted and the surface thereof is glossy is measured.

(4) Heat Resistance

A molded sheet was allowed to stand at 130° C. for 24 hours in a circulating drying machine and the conditions thereof was visually evaluated on the basis of the following 3 grades. ◎: No changes, ○: The crape does not flow, but glosses up, and x: The crape flows, and glosses up.

(5) Tg

The Tg was measured in nitrogen using a DSC [model: DSC220C, manufacturer: product of Seiko Instruments Inc.]. As the pre-stage of measurement, the temperature was increased to 100° C. from room temperature and then decreased to −100° C. The Tg was measured while the temperature was again increased from −100° C. to 100° C. at a rate of temperature rise of 20° C. per min.

(6) Number Average Molecular Weight

The molecular weight was determined by means of Gel Permeation Chromatography [model: HLC-8220, manufacturer: product of Tosoh Corp.] using N,N-dimethylformamide as a solvent.

(7) Volume Average Particle Diameter

The volume average particle diameter is a particle diameter value of particles of undersize fraction of 50% as determined by a Microtrack HRA particle size analyzer 9320-X100 [product of Nikkiso Co., Ltd.].

(8) Bending Test

After a molded sheet was allowed to stand at −35° C. for 1 hour, it was bent into an angle of 180° and the bent portion was observed for the presence or absence of cracks.

Presence of cracks: x

Absence of cracks: ○

(9) Degree of Shrinkage

On the surface of 200 mm×200 mm sheets were drawn datum lines in parallel on the inside of 10 mm from each of the sides. Intervals of two parallel lines were precisely measured at least in 3 places or more to evaluate the average value of each of the lengths and widths. These were set to the original sizes. Sheet were placed in an oven at 110° C., and kept for 800 hours. The sheets were taken out of the oven and allowed to stand for 24 hours at room temperature. Then, again the sizes were measured to evaluate the degree of shrinkage using the following equation.

Degree of shrinkage (%)=100×[original size (mm)− the size after heating (mm)]/original size (mm)

INDUSTRIAL APPLICATION

A polyurethane resin-based material for slush molding of the present invention has the following effects.
1. The material is excellent in heat resistance, and in a high-temperature heat resistance test as well, the surface appearance after testing does not gloss up, or the crape of the surface does not flow.
2. Because the material is excellent in heat melt properties, no irregular color appears, so that a molded body excellent in appearance can be obtained.
3. The powder has good long storage stability.
4. A molded body excellent in abrasion resistance can be obtained.
5. A thermoplastic urethane resin, i.e., a material for instrument panel skin molding of the present invention has a glass transition temperature of from −60° C. to −35° C. This Tg exists within this range even after heat treatment. In addition, a molded body molded by using a material of the present invention does not cause cracks even when subjected to bending testing at low temperature. Also, shrinkage due to heat is not caused, and thus size precision can be maintained.
6. Since an instrument panel skin of the present invention uses the above-mentioned material, it has the performance of hardly causing tear opening in portions but a tear line.
7. A method of production of the present invention can suitably produce the above-mentioned skin of the present invention using the aforementioned material.
8. Furthermore, when an internal release agent (C) for a slush molding polyurethane skin forming agent is used:
   (1) Release properties of polyurethane skin and a mold are excellently provided.
   (2) A detrimental effect is not given on adhesion properties between polyurethane skin and polyurethane foam.
   (3) The skin is excellent in bleed-out property resistance and does not lose the surface appearance of the molded article.

Since the above-described effects are provided, a molded body and slush molded skin for an automobile interior, obtained from a material for slush molding of the present invention, are extremely useful as a variety of interior materials of an automobile, including an instrument panel and a door trim. In addition, the skin is useful for production of instrument panel skin integratedly having air bag door sections formed in such a way that tear lines for tear opening do not appear on the design surface in the air bag door sections of instrument panel skin. Furthermore, application to other molded articles including interior furniture such as a sofa with a skin is possible as well.

The invention claimed is:
1. A material for slush molding, comprising:
a thermoplastic polyurethane resin (A); the difference between the softening starting temperature and the softening ending temperature of said resin (A), by the thermomechanical analysis penetration mode, being from 0 to 30° C., and the softening starting temperature of said resin (A) being from 135 to 200° C.;
wherein said resin (A) comprises
a polyurethane resin having a hard segment (A1) with a number average molecular weight of 200 to 2000 comprising a diisocyanate (a1) having a symmetrical structure, and at least one species selected from the group consisting of a low molecular-weight diamine (a2) having a symmetrical structure and a low molecular-weight diol (a3); and
a soft segment (A2) having a high molecular-weight diol (a4) with a number average molecular weight of 500 to 5000,
with the content of hard segment in the resin (A) being from 5 to 50% by weight, the content of aromatic rings and the content of urea groups satisfying the following relation (i):

$$-0.1x+2.5 \leq y \leq -0.1x+6 \quad \text{(i)}$$

wherein x represents the content (% by weight) of aromatic rings in the resin (A), and y the content (% by weight) of urea groups in the resin (A),
wherein the number average molecular weight of the resin (A) is from 4000 to 40000.
2. The material for molding according to claim 1, in which the content x of aromatic rings in the resin (A) is from 5 to 25% by weight, and in which
the content of aromatic rings and the content y of urea groups satisfy the following relation (i'):

$$-0.1x+3 \leq y \leq -0.1x+5 \quad \text{(i')}.$$

3. The material for molding according to claim 1, in which said hard segment (A1) is a hard segment having a number average molecular weight of 200 to 2000 and comprising a diisocyanate (a1) having a symmetrical structure, and at least one species selected from the group consisting of a low molecular-weight diamine (a2) having a symmetrical structure and a low molecular-weight diol (a3') having a symmetrical structure.
4. The material for molding according to claim 1, in which said diamine (a2) is at least one species selected from the group consisting of straight chain alkylenediamines having a carbon number of 2 to 18, bis(2-aminoethyl) carbonate, 4,4'-dicyclohexylmethanediamine, cyclohexane-1,4-diamine, p-xylylenediamine, α,α,α',α'-tetramethylxylylenediamine, and 4,4'-diamino-diphenylmethane.
5. The material for molding according to claim 1, in which said diisocyanate (a1) is at least one species selected from the group consisting of 1,2-ethylenediisocyanate, 1,4-tetramethylenediisocyanate, 1,6-hexamethylenediisocyanate, 1,12-dodecamethylenediisocyanate, bis(2-isocyanatoethyl) carbonate, 4,4'-dicyclohexylmethanediisocyanate, cyclohexane-1,4-diisocyanate, p-xylylenediisocyanate, α,α,α',α'-tetramethylxylylenediisocyanate, and 4,4'-diphenylmethanediisocyanate.
6. The material for molding according to claim 1, in which a residue of said diamine (a2) has the same structure as a residue of said diisocyanate (a1).
7. The material for molding according to claim 1, in which said diol (a3) is indicated by any one of the general formulas (1), (2), and (3) below:

$$HO(CH_2)_m\text{-}(Q^1)p\text{-}(CH_2)_mOH \quad (1)$$

$$H(OCH_2CH_2)_nO\text{-}Q^2\text{-}O(CH_2CH_2O)_nH \quad (2)$$

$$H(OCH_2CH_2CH_2CH_2)_kO\text{-}Q^2O(CH_2CH_2CH_2CH_2O)_kH \quad (3)$$

wherein in the formula (1), $Q^1$ is a methylene group, 1,4-cyclohexylene group or 1,4-phenylene group, p is 0 or 1, and m is 0 or an integer of 1 to 6 provided that when p is 0 or $Q^1$ is a 1,4-phenylene group, then m is from 1 to 6, in the formulas (2) and (3), $Q^2$ is a residue of bisphenols or 1,4-phenylene group, n is an integer of 1 to 3, and in the formula (3), k is 1 or 2, and when $Q^2$ is a residue of bisphenols, then k is 1.

8. The material for molding according to claim 1, in which the material comprises said resin (A) and plasticizer (B); the material being a powder with a volume average particle diameter of 100 to 500 μm, and the content of powder particles having a particle diameter of 75 μm or less being 20% by weight or less.

9. The material for molding according to claim 8, in which said plasticizer (B) is a phosphoric acid ester indicated by the following general formula (5):

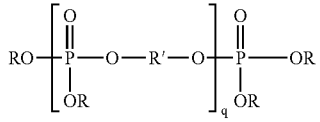
(5)

wherein R is a monovalent hydrocarbon group having a carbon number of 1 to 10, which may be substituted with a halogen, a plurality of Rs may be the same or different, R' is a divalent organic group having a carbon number of 2 to 15, which may be substituted with a halogen, and q is an integer of 1 to 6.

10. The material for molding according to claim 9, in which
R in the general formula (5) is a phenyl group, an alkylphenyl group, or a halogen-substituted phenyl group, and R' is a group indicated by the following general formula (6):

-Ph'-(A-Ph')p-   (6)

wherein Ph' is 1,4-phenylene group, p is 0 or 1, A is a direct bonding, a methylene group, an isopropylidene group, or SO.

11. The material for molding according to claim 8, in which
said plasticizer (B) is an aromatic monocarboxylic acid diester of a polyalkylene glycol.

12. The material for molding according to claim 1, further comprising:
an internal release agent for a slush molding polyurethane surface molding material (C) comprising
at least one species selected from the group consisting of fluorine-modified phosphates (salts) (f) indicated by the general formula (11) and modified silicones containing a polar group (c):
the modified silicones containing a polar group (c) being at least one species selected from the group consisting of carboxyl-modified organopolysiloxanes (c1) indicated by the general formula (8), epoxy-modified organopolysiloxanes (c2) indicated by the general formula (9), and ether-modified organopolysiloxanes (c3) indicated by the general formula (10);

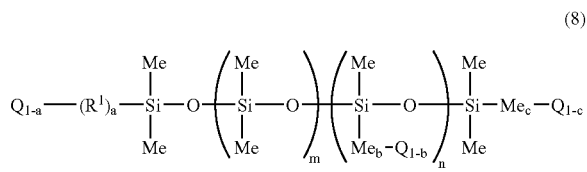
(8)

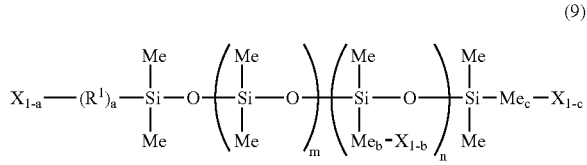
(9)

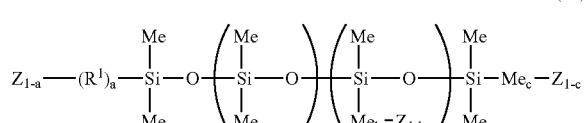
(10)

(11)

wherein in the formulas (8) to (10), 0 is a carboxyl group indicated by —$R^2$COOH, X is an epoxy group indicated by

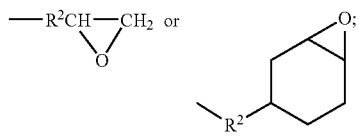

Z is a polyether group indicated by
—$C_3H_6O(C_2H_4O)p$-$C_3H_6O)qR_3$;

$R^1$ is an alkyl group having a carbon number of 1 to 4, $R^2$ is an alkylene group having a carbon number of 1 to 4, $R^3$ is H, an alkyl group having a carbon number of 1 to 4, or an acetyl group, and Me is a methyl group; a, b, and c each are 0 or 1, respectively, and when a=1, and b=1, then c=0; m and n are numbers that satisfy the conditions that (m+n) is from 10 to 200, and n/(m+n) is from 0 to 0.5; p and q are numbers that satisfy the conditions that (p+q) is from 3 to 100, and p/(p+q) is from 0 to 0.6; in the formula (11), Rf is a perfluoroalkyl group having a carbon number of 4 to 20; D is a divalent organic group indicated by —$CH_2CH(E)CsH_{2s}$— or —$SO_2N(R_4)C_tH_{2t}$—, wherein E is H, $CH_3$, $C_2H_5$, Cl or $OR^5$ ($R^5$ is H, $CH_3$, $C_2H_5$, $COCH_3$, $COC_2H_5$, or $CH_2COOH$ or salts thereof), s is an integer of 0 to 4, $R^4$ is an alkyl group having a carbon number of 1 to 4, and t is an integer of 1 to 4; and r is an integer of 2 or 3.

13. The material for molding according to claim 12, in which
the internal release agent (C) comprises
a single species selected from the group consisting of carboxyl-modified organopolysiloxanes (c1) and ether-modified organopolysiloxanes (c3),
a combination of at least one species selected from the group consisting of carboxyl-modified organopolysiloxanes (c1), epoxy-modified organopolysiloxanes (c2) and ether-modified organopolysiloxanes (c3), and fluorine-modified phosphates (salts) (f), or a combination of carboxy-modified organopolysiloxanes (c1) and ether-modified organopolysiloxanes (c3).

14. The material for molding according to claim 1, in which the material further comprises an additive (D).

15. A slush molded article produced by heat molding a material for slush molding of claim 1.

16. A slush molded skin for an automobile interior produced by heat molding a material for slush molding of claim 1.

17. An automobile interior material comprising a slush molded skin of claim 16.

18. The material for slush molding according to claim 1, in which said resin (A) has the glass transition temperature of from −60° C. to −35° C., and the material is a material for molding an instrument panel skin integratedly having air bag door sections formed in such a way that a tear line for tear opening does not appear on the design face.

19. An automobile instrument panel skin which is produced by molding a material for molding of claim 18 and which integratedly has air bag door sections formed in such a way that a tear line for tear opening does not appear on the design face.

20. A method for producing an automobile instrument panel skin integratedly having air bag door sections formed in such a way that a tear line for tear opening does not appear on the design face, comprising:

heat molding the material for molding of claim 18, and forming a tear line for tear opening air bag door sections on the molded product obtained in said heat molding step so that the tear line dose not appear on the design face.

* * * * *